United States Patent [19]

Mullen

[11] Patent Number: 5,310,586
[45] Date of Patent: May 10, 1994

[54] ANGLED I-BEAM HONEYCOMB STRUCTURE

[75] Inventor: Stephen J. Mullen, Beverly, Mass.

[73] Assignee: Eldim, Inc., Woburn, Mass.

[21] Appl. No.: 13,787

[22] Filed: Feb. 5, 1993

[51] Int. Cl.$^5$ .................. B29D 22/00; B29D 23/00; B32B 1/08; B01D 19/00

[52] U.S. Cl. .................. 428/34.1; 29/890.08; 29/455.1; 29/DIG. 37; 29/DIG. 48; 55/276; 156/197; 156/210; 156/256; 156/261; 181/200; 181/212; 181/288; 181/290; 244/1 N; 415/119; 428/593; 428/599; 428/600; 428/615

[58] Field of Search .............. 181/200, 212, 288, 290; 244/1 N; 415/119; 428/593, 599, 600, 615, 636, 34.1, 116, 178, 184, 186; 29/890.08, 455.1, DIG. 37, DIG. 48; 156/210, 256, 261, 197

[56] References Cited

U.S. PATENT DOCUMENTS

| | | |
|---|---|---|
| 520,366 | 5/1894 | Leaver . |
| 787,065 | 4/1905 | White . |
| 798,804 | 9/1905 | Kunz . |
| 1,000,758 | 8/1911 | Rude . |
| 1,100,064 | 6/1914 | Ferres . |
| 1,875,188 | 8/1932 | Williams . |
| 2,481,046 | 9/1949 | Scurlock . |
| 2,833,682 | 5/1958 | Laszlo . |
| 3,009,232 | 11/1961 | Martin ............................ 28/72 |
| 3,024,879 | 3/1962 | Kandra . |
| 3,033,734 | 5/1962 | Price ............................ 156/305 |
| 3,037,592 | 6/1962 | Shipley et al. . |
| 3,060,561 | 10/1962 | Watter ............................ 29/423 |
| 3,071,216 | 1/1963 | Jones et al. . |
| 3,104,194 | 9/1963 | Zahorski . |
| 3,131,789 | 5/1964 | Watter . |
| 3,151,712 | 10/1964 | Jackson . |
| 3,616,025 | 10/1971 | Fairbanks ........................... 156/257 |
| 3,734,234 | 5/1973 | Wirt . |
| 3,748,213 | 7/1973 | Kitchinig et al. . |
| 3,819,007 | 6/1974 | Wirt et al. . |
| 3,821,999 | 7/1924 | Guess et al. . |
| 4,167,598 | 9/1979 | Logan et al. ..................... 428/35 |
| 4,241,806 | 12/1980 | Metzger ........................... 181/284 |
| 4,478,659 | 10/1984 | Hall ................................ 156/73.1 |
| 4,569,878 | 2/1986 | Barrall et al. .................... 428/182 |
| 4,632,862 | 12/1986 | Mullen ........................... 428/178 |
| 4,783,356 | 11/1988 | Kugelmann, Sr. ................ 428/69 |
| 4,957,577 | 9/1990 | Huebner ........................... 156/197 |
| 4,981,744 | 1/1991 | Swank .............................. 428/116 |
| 5,061,541 | 10/1991 | Gertel .............................. 428/116 |

*Primary Examiner*—James C. Cannon
*Attorney, Agent, or Firm*—Testa, Hurwitz & Thibeault

[57] ABSTRACT

A honeycomb structure includes at least two corrugated strips having major flat surfaces extending angularly between opposed strip edges. The strips are offset relative to each other and joined together to define a series of cells extending between the strip edges along axes which are oriented at an angle other than normal to the strip edges. Each of the major flat surfaces includes a central depressed portion forming a matching sub-flat surface which is parallel to and connected to the major flat surface by sidewalls which may be substantially perpendicular to the major flat surface. Abutting undepressed portions of the major flat surfaces of adjacent strips and abutting sub-flat surfaces of adjacent strips are joined together so that the strips form a series of I-beams disposed one to a cell.

19 Claims, 5 Drawing Sheets

ANGLED I-BEAM HONEYCOMB STRUCTURE

BACKGROUND OF THE INVENTION

The invention relates in general to honeycomb assemblies formed of corrugated strips. In particular, the invention concerns honeycomb structures wherein the corrugated strips form I-beams within the open cells of the honeycomb structures and wherein the cells extend at an angle to perpendicular between the face plates.

Honeycomb material has come into increasing use in fields of application where both strength and light weight are important. Honeycomb structures commonly include a sandwich of two face sheets between which a cellular web is fixed to form a unitary structure. Typically, the web is fixed to the face sheets by welding, brazing, or some other similar process. The cellular web is composed of hexagonal or otherwise shaped cells formed by joining similarly configured corrugated strips. The strips are laterally displaced with respect to one another to form webs, as with natural honeycomb. Various materials are used for both the face sheets and the corrugated strips depending upon the application, including steel, aluminum, stainless steel, titanium, and various alloys, both common and exotic.

U.S. Pat. No. 4,632,862, which is commonly assigned, describes a dramatically improved honeycomb structure. That patent pertains to an I-beam honeycomb structure in which conventional honeycomb, having corrugated strips arranged to define, for example, six sided cells, is further formed by centrally depressing the major flat surfaces of the corrugated strips to form parallel sub-flat surfaces. The sub-flat surfaces are connected to the major flat surfaces by side walls which are perpendicular to both the major flats and the sub flats. Joining two or more such corrugated strips with alternate strips inverted, by bonding sub-flats to sub-flats and major flats to major flats, produces a honeycomb web which incorporates I-beams extending end-to-end through the web. The I-beams provide a tremendous degree of strength not found in conventional honeycomb.

One application in which honeycomb structures are frequently used is in the construction of aircraft components. For example, it is known that honeycomb core material assembled with a solid face sheet on one side and a perforated face sheet on the other side is useful for sound attenuation. When the perforated face sheet is exposed to engine exhaust, the honeycomb structure absorbs a portion of the sound being generated by the exhaust. One theory proposes that such a structure's ability to absorb sound is related to the relationship between the frequency of the sound and the depth of the cells of the honeycomb structure.

Varying the depth of the honeycomb cells requires varying the thickness of the entire structure. Accordingly, designing honeycomb structure for attenuation of sound can conflict with structural requirements.

An acoustic honeycomb structure is described in U.S. Pat. No. 3,821,999 in which cells are arranged between two face plates and are tilted relative to perpendicular to the plates. That patent proposes that the use of slanted cavities provides maximum absorption of high intensity pure tone and shock waves, in contrast to other structures which absorb low amplitude sound. It also states that angling the cells relative to the flow of jet engine exhaust enables the absorption of single frequency, slightly irregular sawtooth shock patterns such as are generated in the immediate vicinity of supersonic blade tips of a turbofan engine. In this manner, the patent states, low-frequency harmonic components of the shock pattern are not allowed to develop, which components would require for absorption an acoustic structure operable over a broad bandwith.

A problem with this known angled honeycomb structure, however, is that the angling of the honeycomb cells increases the structure's anticlastic nature. Accordingly, the structure pictured in the patent is in reality unsuitable for many applications because the material cannot be adequately shaped into the configurations typically required of sound attenuating structures.

Another proposed honeycomb structure for attenuating sound over a broad range of frequencies, includes core material which defines cells which taper outwardly at the solid face sheet. This solution has not been entirely satisfactory, however, and alternatives to known honeycomb structures are still being sought.

It is an object of the invention, therefore, to provide a honeycomb structure having increased strength and configuration flexibility. It is another object of the invention to provide a honeycomb structure in which cell depth can be varied independently of face sheet separation distance. Still another object of the invention is to provide a honeycomb structure having highly synclastic qualities.

SUMMARY OF THE INVENTION

These and other objects of the invention are achieved by the present invention which in one aspect features a honeycomb structure including at least two corrugated strips joined together to form a honeycomb web. In some embodiments, the corrugated strips are arranged between face sheets and have opposed edges joined to the face sheets. The corrugated strips form major flat surfaces which extend angularly between the opposed strip edges. The corrugate strips are laterally offset relative to each other to define a series of cells extending between the face sheets. Due to the nature of the major flat surfaces extending angularly between the edges of the strips, the axes of the cells defined by the strips are oriented at an angle other than normal to the face sheets.

Each of the major flat surfaces includes a central depressed portion forming a matching sub-flat surface. The sub-flat surfaces are parallel to and connected to the major flat surfaces by sidewalls which may be substantially perpendicular to the major flat surfaces. The honeycomb structures of the invention are formed by joining together abutting undepressed portions of the major flat surfaces of adjacent strips and abutting sub-flat surfaces of adjacent strips. In this manner, the strips form a series of cells extending between the face sheets and including, one to a cell, a series of I-beams.

In one embodiment of the invention, the face sheets are cylindrical and are arranged with respect to one another so as to define an annular space between them. The corrugated strips are disposed within the annular space, thereby providing a cylindrical honeycomb structure. The cylinder may assume a variety of configurations, such as circular, oval, ellipsoidal, or some other arrangement. Moreover, while the face sheets typically are arranged equidistant apart at all points around the cylinder's circumference, in some applications the distance separating the face sheets varies. In such embodiments of the invention, the opposed edges of the corrugated strips are not parallel to one another so that the honeycomb structure formed by the corrugated strips is of varying width.

One application for the inventive honeycomb structure is for sound attenuation of jet engines. As discussed above, in such applications, the face sheet exposed to the engine exhaust is perforated so that sound generated by the exhaust stream is absorbed by the cells formed by the structure. An advantage of the invention is that the depth of the cells can be varied without varying the distance between the face sheets so that a structure can be designed for optimum sound attenuation, less restricted by maximum panel thickness requirements. Additionally, the I-beam nature of the invention provides a honeycomb panel having significantly improved strength to weight ratio.

In another aspect, the invention features a method for forming a honeycomb structure. The method includes the steps of providing a plurality of corrugated strips having major flat surfaces extending angularly between opposed strip edges and arranging the strips relative to each other to define a series of cells extending between the strip edges along axes which are oriented at an angle other than normal to the strip edges. Abutting major flat surfaces of adjacent strips are then joined together to form a honeycomb structure. In some embodiments of this aspect of the invention, each of the major flat surfaces of the corrugated strips further includes a central depressed portion. The central depressed portion forms a matching sub-flat surface which is parallel to and connected to the major flat surface by sidewalls which may be substantially perpendicular to the major flat surface. In this manner, an I-beam honeycomb structure is formed.

For appropriate applications, the method of the invention includes the step of attaching face sheets to the edges of the joined, corrugated strips. Again, for the construction of sound attenuation structures, one of the face sheets is perforated.

These and other features of the invention will be more fully appreciated by reference to the following detailed description which is to be read in conjunction with the attached drawing.

DETAILED DESCRIPTION

As stated, the invention features a honeycomb structure formed of strips of material corrugated at an angle to the strips' edges. Major flat surfaces of the corrugated strips are depressed to form sub-flat surfaces which are parallel to the major flat surfaces. The strips are joined together, and then, in some embodiments, joined to opposed face sheets, to form a honeycomb structure including I-beam cells extending between the face sheets along axes which are angled relative to the face sheets.

Figure 1:
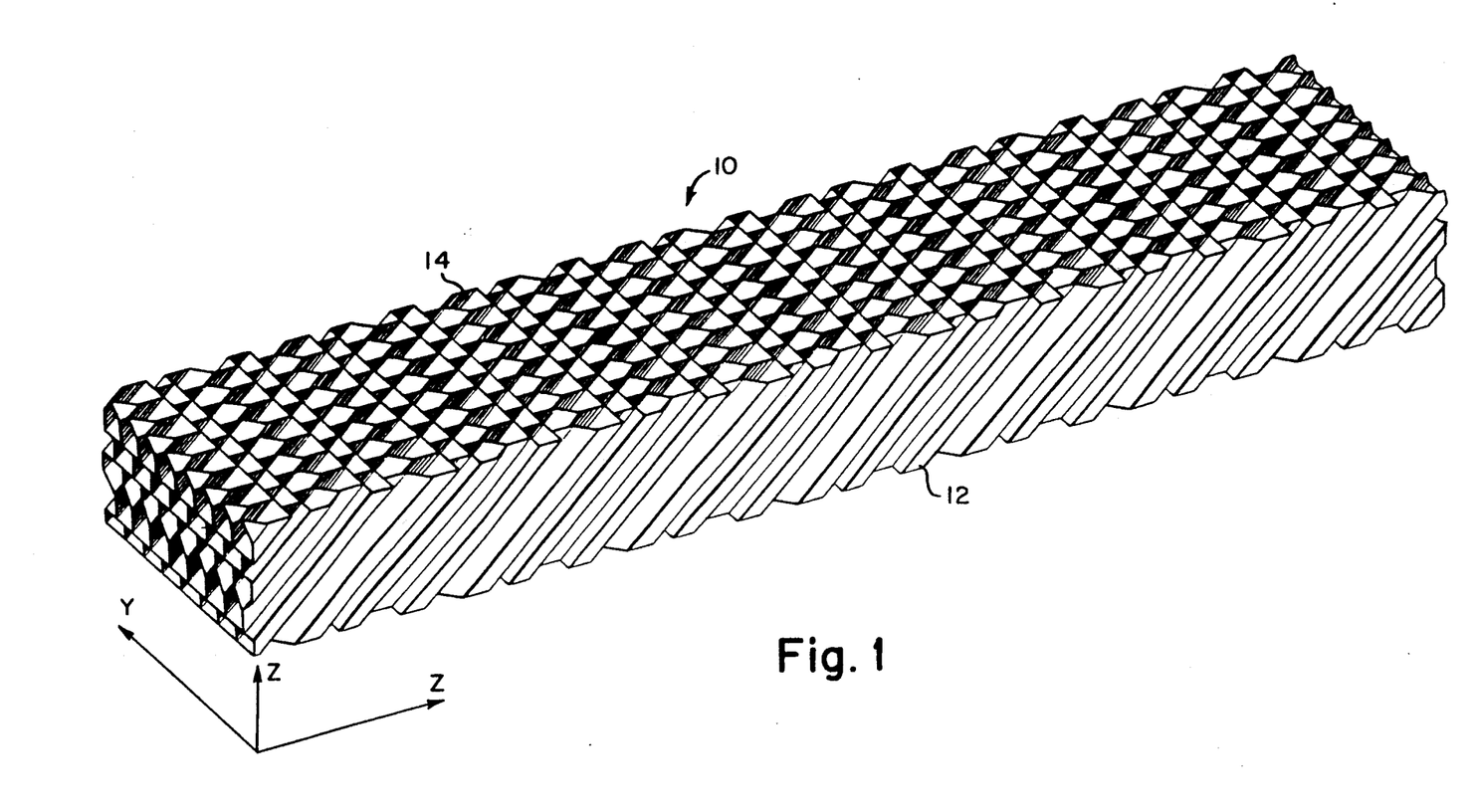
FIG. 1 is a perspective view of angled, I-beam honeycomb core material constructed in accordance with the present invention.

One embodiment of the invention is shown in FIG. 1 which depicts, in perspective, a core structure 10 comprising the inventive honeycomb material. The structure 10 includes multiple corrugated strips 12. Each strip may be said to extend in the designated "X-Z" plane, the depth of the individual strips 12 notwithstanding, and the strips 12 are stacked in the direction of the designated Y axis. Unlike conventional honeycomb, the strips 12 cooperate with one another to define cells 14 extending along axes at an angle to the Z axis. In accordance with the invention, this is achieved by forming corrugations in the strips 12 at an angle to the strip edges other than perpendicular. These features of the invention, both the angled cells and the method of forming the strips, provide numerous advantages, several of which are discussed below in greater detail.

One application for which the honeycomb structure 10 is well suited is the construction of acoustic panels. This is because cell length, which is an important factor in sound absorption, is not dictated by the thickness of the structure, as it is with conventional honeycomb having perpendicularly oriented cells. With the structure 10, the cell can be angled more or less to increase or decrease cell depth, without increasing the overall thickness, or, in the case of cylindrical configurations, diameter, of the structure. One advantage of this approach is that structures having increased cell depth are provided with less material and, therefore, less weight, which is always a concern in the construction of aircraft components.

Another application for which the structure 10 is well suited is fluid flow control. It is well known that when utilizing honeycomb structures for fluid flow control, pressure drop across the thickness of the structure is affected by the ratio of the cell diameter to cell depth. An advantage of the invention, therefore, is that cell depth can be increased or decreased without a concomitant increase or decrease in structure thickness. Another advantage is the direction control afforded by angled cells. Fluid flow can be straightened or angled independently of the orientation of the structure as a whole.

A significant feature of the inventive honeycomb structure stems from the manner in which the individual corrugated strips 12 are formed. Previous methods of manufacturing angled honeycomb structures have involved joining together standard, orthogonally corrugated strips to form standard honeycomb web material, and then machining the faces of the web at an angle to produce an angled structure. This process is extremely wasteful with regard to both the material and manufacturing time consumed.

Figure 2:
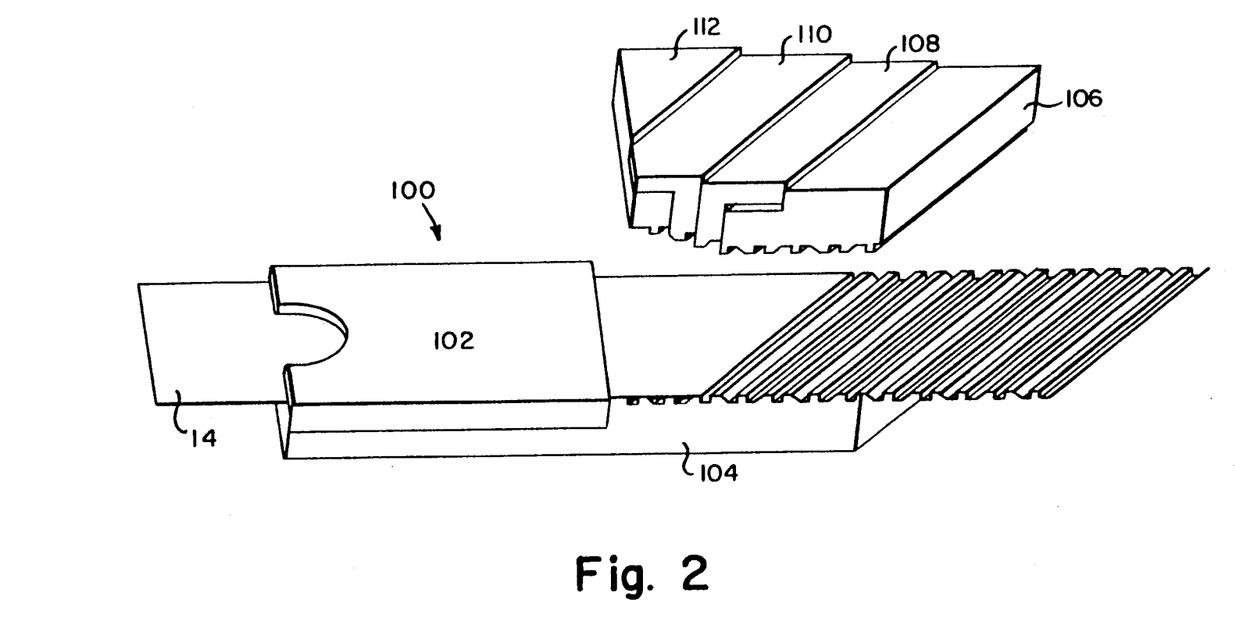
FIGS. 2 and 3 are schematic views of a die stamping machine for forming corrugated strips for the construction of the honeycomb core material shown in FIG. 1.
Figure 3:
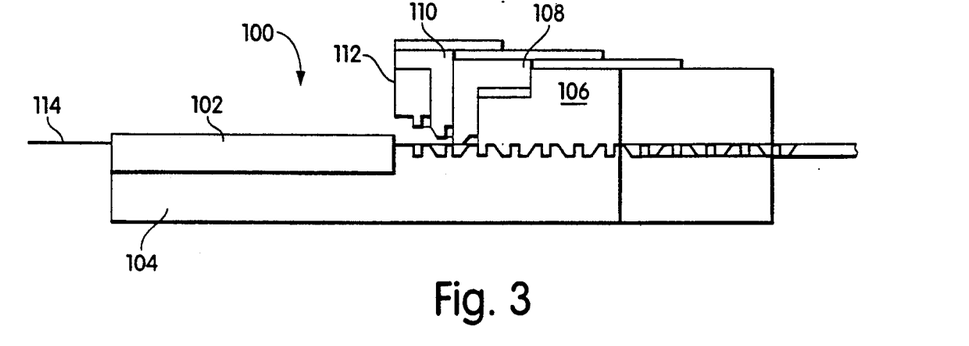

In accordance with the invention, on the other hand, strips are corrugated at an angle to their edges. This is depicted in FIGS. 2 and 3 which show a die stamping machine 100 including a foil guide 102, a die, 104 and four spring loaded punches 106, 108, 110, and 112. To corrugate a strip of material 114, the strip 114 is fed through the guide 102 which keeps it straight during the forming process. The strip 114 is advanced through the guide until a section of preformed corrugations is aligned with punch 106 which engages the strip 114 against die 104. This prevents the strip 114 from backing up during the forming process. Once punch 106 has engaged the strip, punches 108, 110, and 112 are progressively actuated to form additional corrugations and to pull the strip 114 through the guide 102. Once all of the punches have been actuated, they are released and the strip 114 is advanced until the rearmost corrugations are aligned for being grasped by the punch 106, after which the process is repeated.

As stated above, it is a significant feature of the invention that the die stamping machine 100 forms the corrugations at an angle to the edges of the strip 114. This angle can be anywhere between zero and approximately sixty degrees from perpendicular, depending upon the application for which the resulting honeycomb structure is intended. Honeycomb structures formed of strips corrugated in this manner will have cells angled commensurately with the angle of the corrugations. Only minor machining of the strip edges is required after stamping, after which the strips are ready to be joined together to form the angled honeycomb structures discussed below.

Figure 4:
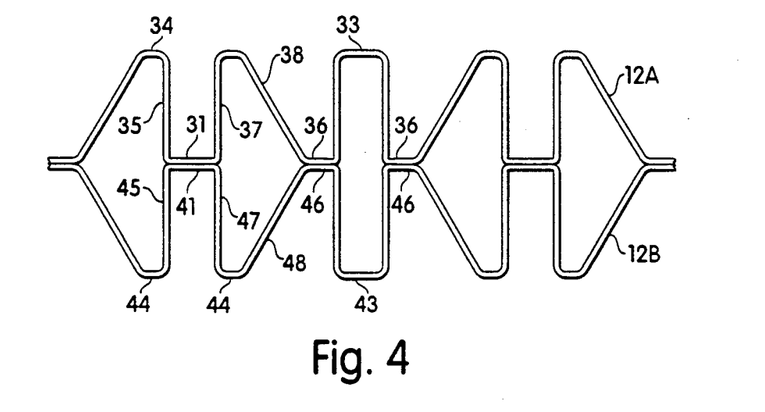
FIG. 4 is a plan view of a pair of corrugated strips formed in accordance with the invention.

A section of a pair of strips 12A and 12B is shown in FIG. 4 in which the I-beam nature of the strips is clearly depicted. The strip 12A includes a major flat 34 connected to a parallel major flat 36 by a slant wall 38. Likewise, the strip 12B has a major flat 44 connected to a parallel flat 46 by a slant wall 48. The flats 36 and 46 as well as similar flats are joined together to form a honeycomb web.

A significant feature of the invention, however, is that each major flat such as flats 34, 36 and 44, 46, has its central area depressed to form parallel surfaces or sub-flats such as 31, 33 and 41, 43. The walls 35 and 37 joining the flat 34 to the sub-flat 31 are preferably perpendicular to the flat 34 and to the sub-flat 31. Likewise, the walls 45 and 47 joining the flat 44 to the sub-flat 41 are preferably normal to those parallel members. The sub-flats 31 and 41 are joined together and what is here denoted as an I-beam is formed with the flat 34 forming one flange which is connected to the parallel flange formed by the flat 44 by means of the vertical walls 35, 45 and 37,47. In some embodiments, the walls 35, 37, 45, and 47 may not be perpendicular to the flats 34 and 44 and the sub-flats 31 and 41. Such a configuration, however, would not depart from the general spirit of the invention.

An advantage of I-beam honeycomb is its resistance to anticlastic curvature. Anti-clastic curvature refers to the phenomenon wherein a body being bent along one axis tends to curve oppositely along a perpendicular axis thereby attaining a saddle-like configuration. This is represented schematically in FIG. 5. Conventional honeycomb is severely anti-clastic while I-beam honeycomb is almost wholly synclastic. This is due, at least in part, to the flexible nature of the angles between the side walls and the sub-flat surfaces and between the side walls and the undepressed portions of the major flat surfaces. As a result, I-beam honeycomb can be manipulated into a virtually limitless array of shapes without distorting the cells, including cylinders, spheres, and curves of extremely small radii.

Figure 5:
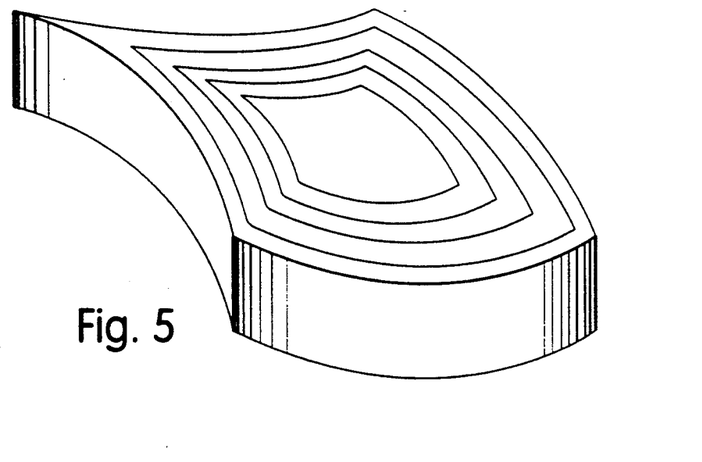
FIG. 5 is a schematic representation of a body experiencing anticlastic curvature.
Figure 6:
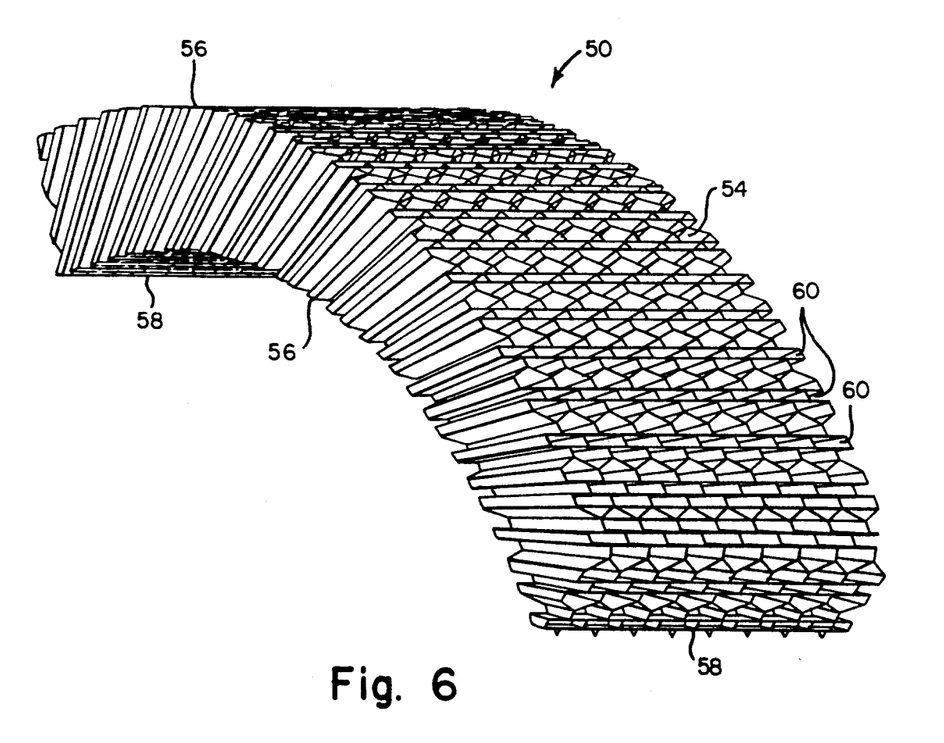
FIG. 6 is a perspective view of a curved section of honeycomb core material formed in accordance with the invention.

This advantage of the inventive honeycomb structure is manifest in FIG. 6 which depicts a curved structure 50 formed of a number of corrugated strips 52. The structure 50 defines lengthwise edges 56 and depthwise edges 58. The structure may be said to define a three-dimensional surface 54. In this configuration, it can be seen that the synclastic nature of the angled, I-beam honeycomb of the invention provides many distinct advantages. That is, while the honeycomb structure 50 is curved along lengthwise edges 56, the depthwise edges 58 remain orthogonal along with the I-beam columns 60. To the contrary, known honeycomb structures exhibit highly anticlastic behavior, and, if configured as shown in FIG. 5, would warp in the depth direction.

Additionally, due to the synclastic nature of the honeycomb material of the invention, the angled cells remain consistently oriented as the structure is manipulated. For example, each of the cells of the structure 50 is oriented at approximately 45 degrees at the curved edge 56 at the base of each cell. This is true for cells along the entire length of the structure and, in cylindrical configurations, around the entire circumference of the cylinder.

This synclastic nature of the inventive honeycomb structure provides numerous advantages in both sound attenuation and flow control applications. For example, keeping the orientation of the honeycomb cells consistent to the faces of the honeycomb structure enables precise engineering of an appropriate structure for a given sound attentuation application. Additionally, consistent orientation of the honeycomb cells is clearly advantageous when those cells are being utilized for directing fluid flow.

Figure 7A:
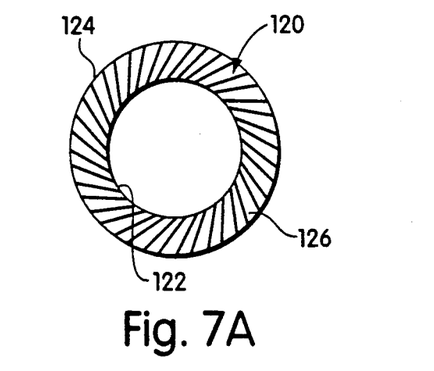
FIGS. 7A, 7B and 7C are schematic, cross-sectional views, taken transaxially, of variously configured structures which can be constructed utilizing the honeycomb material of the invention.
Figure 7B:
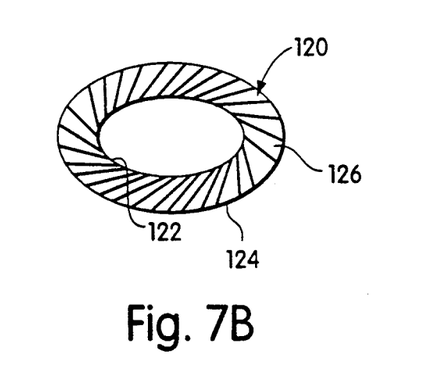
Figure 7C:
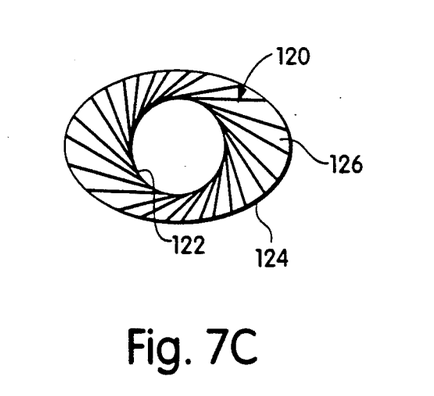

FIGS. 7A, 7B, and 7C show various cylindrical configurations made possible with the inventive honeycomb structure. For example, the synclastic nature of the inventive honeycomb structure enables the construction of round and elliptical structures having consistent thicknesses as well as hybrid structures having round inner diameters and elliptical outer diameters. Other, virtually unlimited, configurations can be constructed as well.

The structures shown in FIGS. 7A, 7B, and 7C are constructed by arranging honeycomb core material 120, formed as set forth above, between opposed face sheets 122 and 124. An advantage of the inventive honeycomb core material, is that the honeycomb cells 126 formed by the core material are oriented consistently all around the circumferences of the depicted cylindrical structures. As stated, for sound attenuation applications, face sheet 122 is typically perforated. It should be understood, however, that structures having face sheets can be formed in other than cylindrical configurations, depending upon the requirements of a given application.

While various embodiments of the invention have been described with particular detail, many variations to those embodiments will be apparent to those skilled in the art which are intended to be embraced within the spirit and scope of the invention. The invention is to be defined, therefore, not by the proceeding detailed description, which is intended as illustrative, but by the claims that follow.

What is claimed is:

1. A honeycomb structure comprising
   a pair of face sheets, and
   at least two corrugated strips arranged between the face sheets and having opposed edges joined to the face sheets, the strips being corrugated to form multiple major flat surfaces extending angularly between the opposed strip edges, the strips being offset relative to each other to define a series of cells extending between the face sheets along axes which are oriented at an angle other than normal to the face sheets, each of the major flat surfaces having a central depressed portion forming a matching sub-flat surface which is parallel to and connected to the major flat surface by sidewalls, abutting undepressed portions of the major flat surfaces of adjacent strips and abutting sub-flat surfaces of adjacent strips being joined together, the strips thereby forming a series of I-beams disposed one to a cell.

2. A honeycomb structure comprising
a pair of face sheets, at least a first of which defines a three-dimensional surface, and
at least two corrugated strips arranged between the face sheets and having opposed edges joined to the face sheets, the strips being corrugated to form multiple major flat surfaces extending angularly between the opposed strip edges, the strips being offset relative to each other to define a series of cells extending between the face sheets along axes which are oriented at a substantially consistent angle other than normal to the face sheets, each of the major flat surfaces having a central depressed portion forming a matching sub-flat surface which is parallel to and connected to the major flat surface by sidewalls, abutting undepressed portions of the major flat surfaces of adjacent strips and abutting sub-flat surfaces of adjacent strips being joined together, the strips thereby forming a series of I-beams disposed one to a cell.

3. A honeycomb structure comprising
a pair of cylindrical face sheets arranged to define an annular space therebetween, and
at least two corrugated strips arranged between the face sheets in the annular space and having opposed edges joined to the face sheets, the strips being corrugated to form multiple major flat surfaces extending angularly between the opposed strip edges and being offset relative to each other to define a series of cells extending between the face sheets along axes which are oriented at the face sheets at a substantially consistent angle all around the cylinder, each of the major flat surfaces having a central depressed portion forming a matching sub-flat surface which is parallel to and connected to the major flat surface by sidewalls, abutting undepressed portions of the major flat surfaces of adjacent strips and abutting sub-flat surfaces of adjacent strips being joined together, the strips thereby forming a series of I-beams disposed one to a cell, and
wherein the corrugated strips are arranged between the parallel face sheets so that all of the cells extend along axes which are oriented at the face sheets at a substantially consistent angle other than normal to the face sheets.

4. A honeycomb structure as set forth in any of claims 1, 2, or 3 wherein one of the face sheets is perforated.

5. A honeycomb structure as set forth in any of claims 1, 2, or 3 wherein the corrugated strips further include slant walls connecting the major flat surfaces.

6. A honeycomb structure as set forth in any of claims 1, 2, or 3 wherein the cell axes are oriented at an angle of between zero and approximately sixty degrees with respect to normal to the face sheets.

7. A honeycomb structure as set forth in any of claims 1, 2, or 3 wherein the opposed edges of the corrugated strips are substantially parallel to one another.

8. A honeycomb structure as set forth in claim 3 wherein both of face sheets have circular cross sections.

9. A honeycomb structure as set forth in claim 3 wherein one of the face sheets has a circular cross section.

10. A honeycomb structure as set forth in any of claims 1, 2, or 3 wherein the sidewalls connecting the major flat surfaces to the sub-flat surfaces are substantially perpendicular to those surfaces.

11. A substantially synclastic honeycomb structure comprising at least two corrugated strips having major flat surfaces extending angularly between opposed strip edges, the strips being offset relative to each other and joined together to define a series of cells extending between the strip edges along axes which are oriented at an angle other than normal to the strip edges, each of the major flat surfaces having a central depressed portion forming a matching sub-flat surface which is parallel to and connected to the major flat surface by sidewalls, abutting undepressed portions of the major flat surfaces of adjacent strips and abutting sub-flat surfaces of adjacent strips being joined together, the strips thereby forming a series of I-beams disposed one to a cell.

12. A honeycomb structure as set forth in claim 11 wherein the structure includes at least one face defining a three dimensional surface.

13. A honeycomb structure as set forth in claim 11 wherein the sidewalls connecting the major flat surfaces to the sub-flat surfaces are substantially perpendicular to those surfaces.

14. A method for making a honeycomb structure comprising the steps of
providing a plurality of corrugated strips having major flat surfaces extending angularly between opposed strip edges,
arranging the strips relative to each other to define a series of cells extending between the strip edges along axes which are oriented at an angle other than normal to the strip edges, and
joining abutting major flat surfaces of adjacent strips together to form a honeycomb structure.

15. A method as set forth in claim 14 wherein each of the major flat surfaces of the corrugated strips further includes a central depressed portion forming a matching sub-flat surface which is parallel to and connected to the major flat surface by sidewalls.

16. A method as set forth in either of claim 14 or claim 15 further comprising the step of attaching face sheets to the edges of the joined, corrugated strips.

17. A method for making a honeycomb structure comprising the steps of
corrugating a plurality of strips to have major flat surfaces extending angularly between opposed strip edges,
arranging the strips relative to each other to define a series of cells extending between the strip edges along axes which are oriented at an angle other than normal to the strip edges, and
joining abutting major flat surfaces of adjacent strips together to form a honeycomb structure.

18. A method as set forth in claim 17 wherein the step of corrugating a plurality of strips further includes providing each of the major flat surfaces with a central depressed portion forming a matching sub-flat surface which is parallel to and connected to the major flat surface by sidewalls.

19. A method as set forth in either of claim 17 or claim 18 further comprising the step of attaching face sheets to the edges of the joined, corrugated strips.

* * * * *

Disclaimer 5,310,586—Stephen J. Mullen, Beverly, Mass. ANGLED I-BEAM HONEYCOMB STRUCTURE. Patent dated May 10, 1994. Disclaimer filed April 7, 1997, by the assignee, Eldim, Inc.

Hereby enters this disclaimer to claims 14, 16, 17, and 19 of said patent.
*(Official Gazette,* June 17, 1997)